(12) United States Patent
Schmidt

(10) Patent No.: US 9,212,698 B2
(45) Date of Patent: Dec. 15, 2015

(54) BEARING UNIT FOR A TURBOCHARGER

(71) Applicant: Schaeffler Technologies GmbH & Co. KG, Herzogenaurach (DE)

(72) Inventor: Heiko Schmidt, Muhlhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/391,280

(22) PCT Filed: Mar. 6, 2013

(86) PCT No.: PCT/EP2013/054453
§ 371 (c)(1),
(2) Date: Oct. 8, 2014

(87) PCT Pub. No.: WO2013/156194
PCT Pub. Date: Oct. 24, 2013

(65) Prior Publication Data
US 2015/0078696 A1    Mar. 19, 2015

(30) Foreign Application Priority Data

Apr. 20, 2012  (DE) .......................... 10 2012 206 556

(51) Int. Cl.
*F16C 19/18* (2006.01)
*F16C 33/66* (2006.01)
*F16C 33/60* (2006.01)
(Continued)

(52) U.S. Cl.
CPC .............. *F16C 33/60* (2013.01); *F01D 25/125* (2013.01); *F01D 25/164* (2013.01); *F16C 19/181* (2013.01); *F16C 25/083* (2013.01); *F16C 27/045* (2013.01); *F16C 35/067* (2013.01); *F16C 35/077* (2013.01); *F16C 19/184* (2013.01);
(Continued)

(58) Field of Classification Search
CPC .... F16C 19/527; F16C 35/067; F16C 35/077; F16C 33/60; F16C 18/183; F16C 27/045; F16C 33/76; F16C 2360/24; F05D 2220/40
USPC ........... 384/99, 474, 512–513, 517–518, 504, 384/539, 906
See application file for complete search history.

(56) References Cited

U.S. PATENT DOCUMENTS 1,448,189 A * 3/1923 Brunner ........................ 384/611
2,973,136 A * 2/1961 Greenwald ................... 417/407
(Continued)

FOREIGN PATENT DOCUMENTS

CN           101010521           8/2007
CN           101568736           10/2009
(Continued)

*Primary Examiner* — Marcus Charles
(74) *Attorney, Agent, or Firm* — Volpe and Koenig, P.C.

(57) ABSTRACT

A bearing unit (1) for a turbocharger is provided having a bearing housing (5) extending in an axial direction and having a through-hole, and a rolling-contact bearing (3) arranged coaxially within the through-hole and having a bearing inner ring (7), a bearing outer ring (13) divided axially into first and second part rings (9, 11), and a number of rolling-contact elements (15). The bearing outer ring (13) is mounted in a vibration-damping oil film (23), and the two part rings (9, 11) are spaced axially apart from each other by a pretensioning spring (19). The first part ring (9) has a first groove (43) with a first securing ring (39) arranged therein, and the first securing ring (39) is supported axially from the outside against the bearing housing (5).

10 Claims, 3 Drawing Sheets

(51) Int. Cl.
*F16C 25/08* (2006.01)
*F16C 19/52* (2006.01)
*F01D 25/12* (2006.01)
*F01D 25/16* (2006.01)
*F16C 35/077* (2006.01)
*F16C 27/04* (2006.01)
*F16C 35/067* (2006.01)

(52) U.S. Cl.
CPC ............ *F16C 19/527* (2013.01); *F16C 2360/24* (2013.01)

(56) References Cited

U.S. PATENT DOCUMENTS

| | | | | |
|---|---|---|---|---|
| 2,991,926 A | * | 7/1961 | Diefenderfer | 417/406 |
| 3,017,230 A | * | 1/1962 | Meermans | 384/479 |
| 4,641,978 A | * | 2/1987 | Kapich | 384/102 |
| 4,652,219 A | * | 3/1987 | McEachern et al. | 417/407 |
| 4,676,667 A | | 6/1987 | Komatsu et al. | |
| 4,721,441 A | * | 1/1988 | Miyashita et al. | 417/407 |
| 4,808,091 A | * | 2/1989 | Ruetz | 417/407 |
| 4,997,290 A | * | 3/1991 | Aida | 384/99 |
| 5,076,766 A | * | 12/1991 | Gutknecht | 417/407 |
| 5,890,881 A | * | 4/1999 | Adeff | 417/407 |
| 7,104,693 B2 | * | 9/2006 | Mavrosakis | 384/99 |
| 7,214,037 B2 | * | 5/2007 | Mavrosakis | 417/406 |
| 7,628,542 B2 | | 12/2009 | Wada et al. | |
| 7,832,938 B2 | | 11/2010 | McKeirnan, Jr. | |
| 8,985,857 B2 | * | 3/2015 | Schmidt et al. | 384/504 |
| 2008/0163622 A1 | * | 7/2008 | Schlegl et al. | 60/599 |
| 2012/0051906 A1 | | 3/2012 | House et al. | |

FOREIGN PATENT DOCUMENTS

| | | | |
|---|---|---|---|
| CN | 102414421 | | 4/2012 |
| DE | 3531313 | | 3/1986 |
| DE | 102010019528 A1 | * | 11/2011 |
| DE | 102010035665 | | 3/2012 |
| GB | 729455 A | * | 5/1955 |
| GB | 858190 | | 1/1961 |
| GB | 858190 A | * | 1/1961 |
| JP | H11101128 | | 4/1999 |
| JP | 2013217436 A | * | 10/2013 |
| WO | 2012025531 | | 3/2012 |
| WO | WO 2012079788 A1 | * | 6/2012 |
| WO | WO 2012079882 A1 | * | 6/2012 |

* cited by examiner

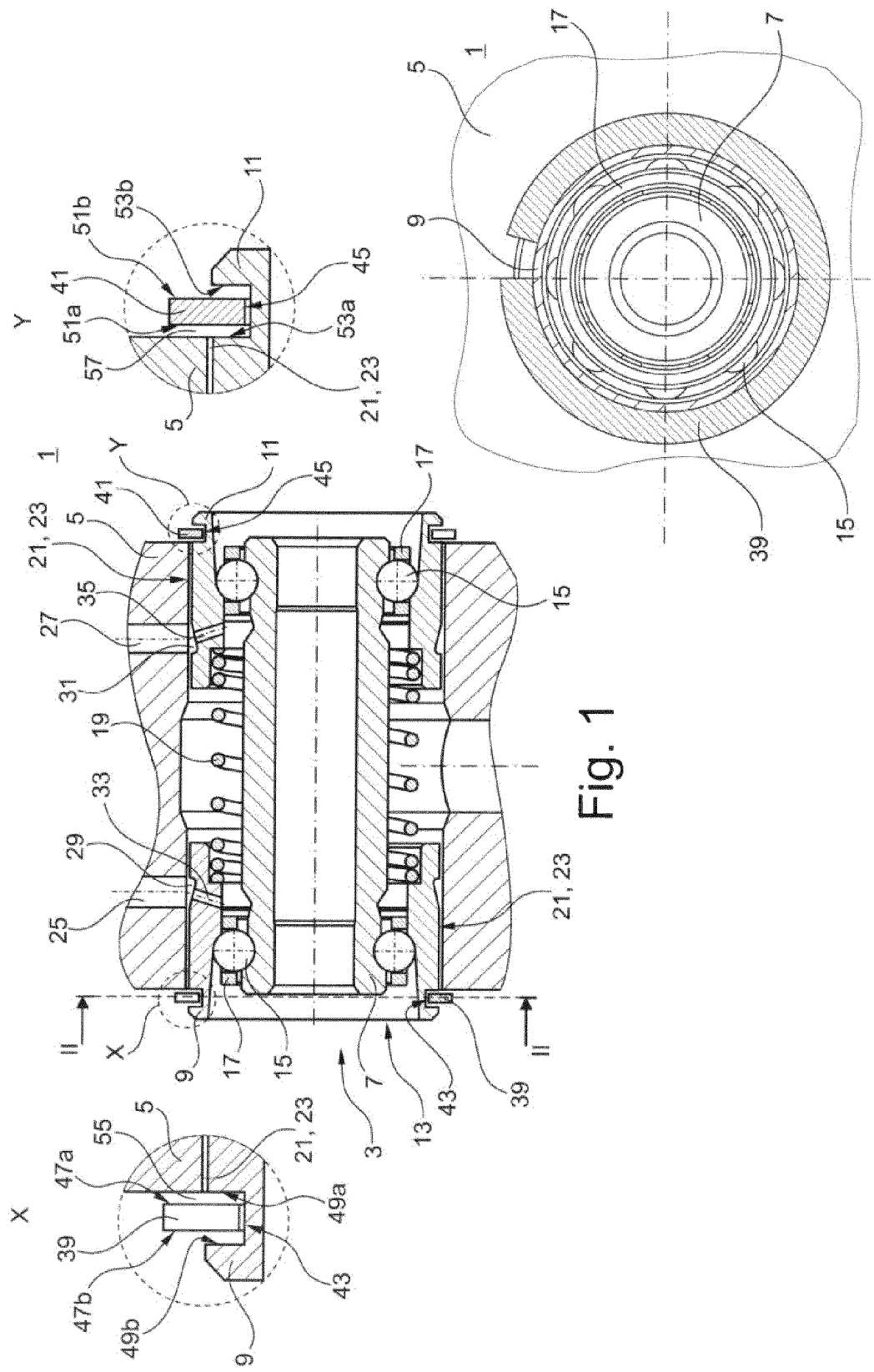

BEARING UNIT FOR A TURBOCHARGER

CROSS REFERENCE TO RELATED APPLICATIONS

This application is a continuation of International Application No. PCT/EP2013/054453, filed Mar. 6, 2013, which claims the benefit of German Patent Application No. 102012206556.3, filed Apr. 20, 2012.

FIELD OF THE INVENTION

The invention relates to a bearing unit for a turbocharger comprising a bearing housing extending in an axial direction with a through-hole and also a roller bearing arranged coaxially within the through-hole with a bearing inner ring, a bearing outer ring divided axially into first and second sub-rings, and a number of roller bodies. Here, the bearing outer ring is mounted in a vibration-damping oil film and the two sub-rings are spaced apart from each other axially by means of a pretensioning spring.

BACKGROUND

A turbocharger is typically used for increasing the output of an internal combustion engine through the use of energy from the exhaust gas. The turbocharger here consists of, in particular, a compressor and a turbine that are connected to each other by means of a shaft mounted in a bearing housing. During operation, the turbine is set into rotation by a flow of exhaust gas and drives the compressor by means of the shaft, wherein this compressor suctions and compresses air. The compressed air is led into the engine, wherein, due to the increased pressure during the suction cycle, a large amount of air is led into the cylinder. In this way, during each intake cycle, more oxygen is led into the combustion chamber of the engine.

Typically this leads to an increase in the maximum torque, wherein the power output, that is, the maximum output at constant working volume, is increased. This increase allows, in particular, the use of a more powerful engine with approximately the same dimensions or alternatively makes possible a reduction of the engine dimensions, that is, the realization of a comparable output for a smaller and lighter weight engine.

For effective operation of the turbocharger, the shaft and thus also the turbine and the compressor regularly rotate at high rotational speeds of, at times, up to 300,000 rpm. Especially due to the high rotational speeds, vibrations caused, for example, by the rotation of the shaft can be transmitted to the bearing unit and its individual components. To keep undesired contact with the bearing housing or individual components with each other as low as possible and to guarantee an interference-free and low-noise operation of a turbocharger, typically a bearing unit is used in which the resulting vibrations can be damped by so-called squeeze-film dampers. Normally, such a squeeze-film damper is formed essentially from an annular gap that is formed between a bearing and a bearing housing and is connected to an oil feed and is filled with a vibration-damping oil film.

Here, in particular, an outer ring of a typical roller bearing is separated from the bearing housing by a vibration-damping oil film, so that there is no direct contact between the bearing housing and outer ring. DE 10 2010 035 665 A1 describes, for example, a support for a turbocharger in which a squeeze film is present between the inner periphery of a bearing housing and the outer periphery of an outer ring of a bearing cartridge. Through such a floating bearing of the outer ring, this can be basically shifted in the axial direction. So that the bearing outer ring nevertheless always remains in the desired position and does not "slip" in the axial direction, it must be secured in the axial direction.

SUMMARY

The invention is based on the objective of providing a bearing unit for a turbocharger that allows limitation of the axial path of the bearing outer ring with an economical and simple production or assembly.

The objective is met according to the invention by a bearing unit for a turbocharger that comprises a bearing housing extending in an axial direction with a through-hole, and a roller bearing arranged coaxially within the through-hole with a bearing inner ring, a bearing outer ring divided axially into a first and a second sub-ring, and a number of roller bodies. The bearing outer ring is mounted in a vibration-damping oil film. The two sub-rings are spaced apart from each other axially by means of a pretensioning spring. The first sub-ring has a first groove with a first securing ring arranged therein and the first securing ring is supported axially from the outside against the bearing housing.

The invention starts from the idea of designing and arranging components and assemblies in series production also such that they can be produced relatively economically and assembled easily and precisely with regard to installation. This is applicable even more so for automated production in which it is often easier and more economical to process and install components that have a simple geometric shape. The invention further starts from the idea that it significantly simplifies the installation process when a component to be installed is accessible from the outside. Therefore, the invention provides an easy-to-manufacture groove in the first sub-ring of the bearing outer ring and a securing ring that engages in this groove and is easy to produce, by which the bearing outer ring can be axially secured and limited in its axial movement. Here, the securing ring is supported axially from the outside against the bearing housing. This makes it possible to provide installation that is simple and fast and especially accessible from the outside.

The roller bearing has a rotational axis and is used, in particular, for the secure mounting of the shaft of the turbocharger, wherein it absorbs radial and axial forces and simultaneously allows the shaft to rotate. The roller bearing includes two bearing rings, a bearing inner ring, and a bearing outer ring that is divided axially into two sub-rings. Roller bodies that roll on raceways integrated into the bearing rings are arranged between the bearing inner ring and bearing outer ring. For example, cylinder rollers or tapered rollers could be used as the roller bodies.

In one advantageous embodiment, the bearing inner ring of the bearing unit is formed partially or completely by the shaft. The shaft is understood to be a rod-like, rotating component that is provided to connect the compressor and the turbine of the turbocharger to each other directly or indirectly for transferring torque, wherein the shaft is aligned collinear to the rotational axis. An indirect connection can here include additional parts, as is often required, for example, for fastening the compressor to the shaft. The additional parts can be nuts, other fasteners, or also joined shaft sections.

The shaft of the turbocharger bearing ideally forms the bearing inner ring completely or partially and thus also one or two roller body raceways. It is conceivable that only one roller body raceway is formed by the shaft itself, that is, is integrated into this part, and a separate inner ring is pressed or mounted onto the shaft for the second raceway. Even more preferably is a material-locking integration of the entire bearing inner ring with all roller body raceways, in particular, two outer raceways. This integration can be realized through the production of the bearing inner ring connected with a material lock with the shaft from one workpiece. Alternatively, welding or the like can lead to a material lock between the bearing inner ring and shaft. Here it is advantageous that the bearing is stress-free to the outside, because the axial forces that are produced by the pretensioned inner rings can be compensated in the shaft.

The two sub-rings are spaced apart from each other axially by a pretensioning spring. The pretensioning spring is positioned between the two sub-rings and presses the sub-rings away from each other and holds them in an elastic way and pretensioned against the roller bodies in the provided position. The pretensioning spring can be formed, for example, as a metallic spiral spring.

The oil film is used, in particular, for supporting the bearing outer ring, wherein the vibrations of the bearing outer ring are damped by the oil film. The oil film has a corresponding thickness depending on the construction of the bearing arrangement or the annular gap with the oil film has the corresponding width. To be considered here are, for example, the size of the respective components, the rotational speeds of the shaft, and the density and viscosity of the oil.

Preferably, the bearing outer ring is positioned, for example, by one or more securing elements, so that it cannot rotate in the vibration-damping oil film. Here, the rotational locking can be constructed so that rotation of the bearing outer ring is prevented completely as much as possible or a certain play with respect to rotation is present, that is, a certain rotational angle is possible.

Here, the bearing outer ring mounted in the oil film has a limited radial play and a certain axial play. This play is defined in the required guide accuracy especially so that different changes in length between the bearing inner ring, bearing outer ring, and bearing housing can be compensated and these do not lead to tensioning of the roller bearing. Here, a secure support of the bearing outer ring in the area of the play must always be guaranteed.

For the axial path limitation of the bearing outer ring, the first sub-ring has a first groove with a first securing ring arranged therein, wherein the first securing ring is supported axially from the outside against the bearing housing. Preferably, the groove is formed on the radially outer lateral surface of the first sub-ring. Here, the groove is arranged around the entire lateral surface and especially essentially perpendicular to the rotational axis. The groove can be generated, in particular, through cutting processes, for example, turning.

The securing ring inserted into the groove can be supported directly or indirectly against the bearing housing. In other words, the securing ring can contact directly against the bearing housing. However, it can also contact, in particular, against a different part that is in contact, in turn, with the bearing housing, wherein the securing ring is supported indirectly against the bearing housing. The securing ring here is used, in particular, as an axial end stop. The securing ring prevents an undesired slipping of the bearing outer ring and absorbs axial forces and transfers these into the bearing housing. To implement an axial path limitation with respect to both axial directions in the bearing outer ring divided axially into two sub-rings, a corresponding second groove with a second securing ring arranged therein is preferably formed within the bearing unit.

The specified bearing unit has the advantage, in an economical and simple production or assembly, of making possible an axial path limitation of the bearing outer ring. A groove on the rotationally symmetric bearing outer ring that is easily accessible for processing and a corresponding securing ring can be produced economically through simple production methods and with simple machines and tools. In addition, the securing ring on the bearing outer ring can be installed quickly and easily. By supporting the securing ring inserted into the groove on the bearing housing, a simple to produce but effective axial path limitation of the divided bearing outer ring is achieved. Furthermore, additional components or constructions to be produced separately that are used as contact points for the securing ring must not be produced or formed, for example, at a point within the bearing housing that is difficult to access for processing and installation. Because axial forces can be guided via the bearing outer ring and the securing ring into the bearing housing, the pretensioning spring force can also be selected relatively low, because a corresponding axial force does not have to be supported by means of the spring.

In one advantageous embodiment, a carrier ring is arranged between the bearing housing and the bearing outer ring, wherein the first securing ring is supported indirectly by means of the carrier ring against the bearing housing. Thus, the roller bearing is arranged, in particular, coaxial within the carrier ring. Here, a vibration-damping oil film is present between the bearing outer ring and carrier ring, wherein the bearing outer ring is supported, in turn, in an oil film and has a limited radial play and a certain axial play.

The first securing ring is here supported axially from the outside, in particular, on an end face of the carrier ring that is in direct or indirect contact with the bearing housing. Thus, the first securing ring is supported indirectly by means of the carrier ring axially from the outside against the bearing housing and axial forces are transferred via the securing ring and the carrier ring into the bearing housing. To achieve an axial path limitation with respect to both axial direction in the axially divided bearing outer ring, a corresponding second groove with a second securing ring arranged therein is formed preferably on the second sub-ring or on the carrier ring. The carrier ring makes it possible, in particular, that the roller bearing can be preassembled, including axial path limitation of the bearing outer ring. Here, initially the roller bearing is mounted and then the carrier ring is placed and the securing rings are attached. For a roller bearing preassembled in this way, the through-hole of the bearing housing also must be accessible only from one axial direction.

Advantageously, an axial gap with a vibration-damping oil film is formed between the first securing ring and the bearing housing or an axial gap with a vibration-damping oil film is formed between the first securing ring and the carrier ring. This means that an axial gap with the oil film is formed between the end face of the first securing ring on the housing side in the axial direction and facing the axial bearing housing center and a contact surface of the bearing housing or of the carrier ring used for the first securing ring. The contact surface can here be formed on the bearing housing or carrier ring or can be, in particular, an area of an end face of the bearing housing or carrier ring. Thus, the first securing ring can be contacted not directly, but instead indirectly via an oil film on the bearing housing or on the carrier ring. Through this oil film, vibrations that occur are damped and a direct contact of the components with each other is prevented as much as possible. This has a further positive effect on low-noise operation. Furthermore, the bearing loads are reduced and thus the service life of the bearing unit is prolonged. In addition, the oil film contributes to the fact that a flattest possible, planar support is provided and thus, in particular, no tipping moment is transferred to the bearing outer ring.

Preferably, the carrier ring is locked in rotation with the bearing housing. Here, in particular, an interference fit or a press fit can be present between the bearing housing and carrier ring. The carrier ring, however, can also be provided with a flange, for example, and bolted with the bearing housing and in this way locked in rotation.

Alternatively, between the bearing housing and outer periphery of the carrier ring, an intermediate space with a vibration-damping oil film is formed. Between the bearing outer ring and carrier ring there is, in particular, a tight clearance fit. Here, in addition to the oil film formed between the bearing outer ring and inner periphery of the carrier ring there is also a vibration-damping oil film in the intermediate space between the bearing housing and outer periphery of the carrier ring. Thus, both the bearing outer ring and also the carrier ring are mounted in an oil film. Because the carrier ring in this construction basically can move in the axial direction, it can be axially secured by a direct or indirect contact on a correspondingly shaped bearing housing or a component attached to the bearing housing. For this purpose, a securing plate can be attached fixed to the housing on an end side of the bearing housing.

Preferably, the carrier ring is positioned in the oil film, for example, locked in rotation by one or more securing elements. Here, the rotational locking can be formed such that a rotation of the carrier ring is completely prevented as much as possible or there is a certain play with regard to rotation, that is, a certain rotational angle is possible.

In one preferred embodiment, the carrier ring has a second groove with a second securing ring arranged therein, wherein the second sub-ring is supported axially against the second securing ring. The first groove with the first securing ring arranged therein is arranged on the first sub-ring, wherein here the first securing ring is supported axially from the outside via the carrier ring indirectly against the bearing housing. The second groove with the second securing ring arranged therein is formed in the radially inner lateral surface of the carrier ring. Here, the groove is arranged, in particular, perpendicular to the rotational axis and completely all around the lateral surface. Viewed in the axial direction, the second groove is arranged between the two sub-rings in the area of the inner end face of the second sub-ring. The end face of the second securing ring facing the second sub-ring is used as an axial stop and path limitation for the second sub-ring. In this way, the divided bearing outer ring is secured with respect to both axial directions and axial forces that occur can be guided via the securing rings and the carrier ring into the bearing housing.

Alternatively, the second sub-ring has a second groove with a second securing ring arranged therein, wherein the second securing ring is supported axially from the outside against the bearing housing. Thus, here both the first and also the second securing ring are supported axially from the outside against the bearing housing. Preferably, the second groove is attached to the radially outer lateral surface of the second sub-ring. Here, the second groove is arranged, in particular, perpendicular to the rotational axis and completely all around the lateral surface. The first and second securing ring can be supported directly or indirectly axially from the outside against the bearing housing. A securing ring is used here as an axial end stop with respect to an axial direction, wherein the two correspondingly arranged securing rings produce an axial path limitation with respect to both axial directions. If a carrier ring is arranged between the bearing housing and the bearing outer ring, then both securing rings are supported indirectly via the carrier ring on the bearing housing.

Advantageously, the second securing ring is arranged on the second sub-ring and an axial gap with a vibration-damping oil film is formed between the second securing ring and the bearing housing or the second securing ring and the carrier ring, or the second securing ring is arranged on the carrier ring and an axial gap with a vibration-damping oil film is formed between the second securing ring and the second sub-ring. In other words, for a second groove arranged on the second sub-ring with second securing ring inserted therein, an axial gap with the oil film is formed between the end face of the second securing ring in the axial direction on the housing side and facing the axial bearing housing center and a contact surface of the bearing housing or of the carrier ring used for the second securing ring. The contact surface can be formed here on the bearing housing or carrier ring or, in particular, can be an area of an end face of the bearing housing or of the carrier ring. Thus, the second securing ring cannot directly contact, but indirectly via an oil film, on the bearing housing or on the carrier ring. If, in contrast, the carrier ring has the second groove with second securing ring inserted therein, then an axial gap with an oil film is formed between the axially inner end face of the second sub-ring and the end face of the second securing ring facing the second sub-ring. Thus, the second sub-ring contacts not directly, but instead indirectly via an oil film on the second securing ring. By means of the oil film, vibrations are damped and a direct contact of the components with each other is prevented as much as possible, which also has a positive effect on low-noise operation. Furthermore, the bearing loads are significantly reduced, which leads to a longer service life of the bearing unit. In addition, the oil film contributes to the fact that there is a flattest possible, planar support and thus, in particular, no tipping moment is transferred to the bearing outer ring.

Advantageously, a gap with a vibration-damping oil film is formed between a groove flank and an end face of a securing ring. For forming a corresponding gap, the groove width is greater than the thickness of the securing ring. Preferably, a corresponding gap with an oil film is formed between both end faces of a securing ring and the two groove flanks of the corresponding groove. By means of this oil film, vibrations that occur can be further damped and noises and bearing loads can be further reduced.

In one advantageous embodiment, the roller bearing is formed as a two-row angular contact ball bearing. The roller bodies here are formed as balls accordingly. A two-row angular contact ball bearing can be loaded in the axial and radial directions.

Preferably, the securing ring is formed as a snap ring. According to an actual construction, here a standard snap ring, as well as a snap ring produced especially for this particular device, can be used.

BRIEF DESCRIPTION OF THE DRAWINGS

Embodiments of the invention are explained in more detail below with reference to a drawing. Shown are:

FIG. 1 a bearing unit for a turbocharger in a longitudinal section,

FIG. 2 the bearing unit according to FIG. 1 in a cross section II-II,

DETAILED DESCRIPTION OF THE PREFERRED EMBODIMENTS

Figure 3:
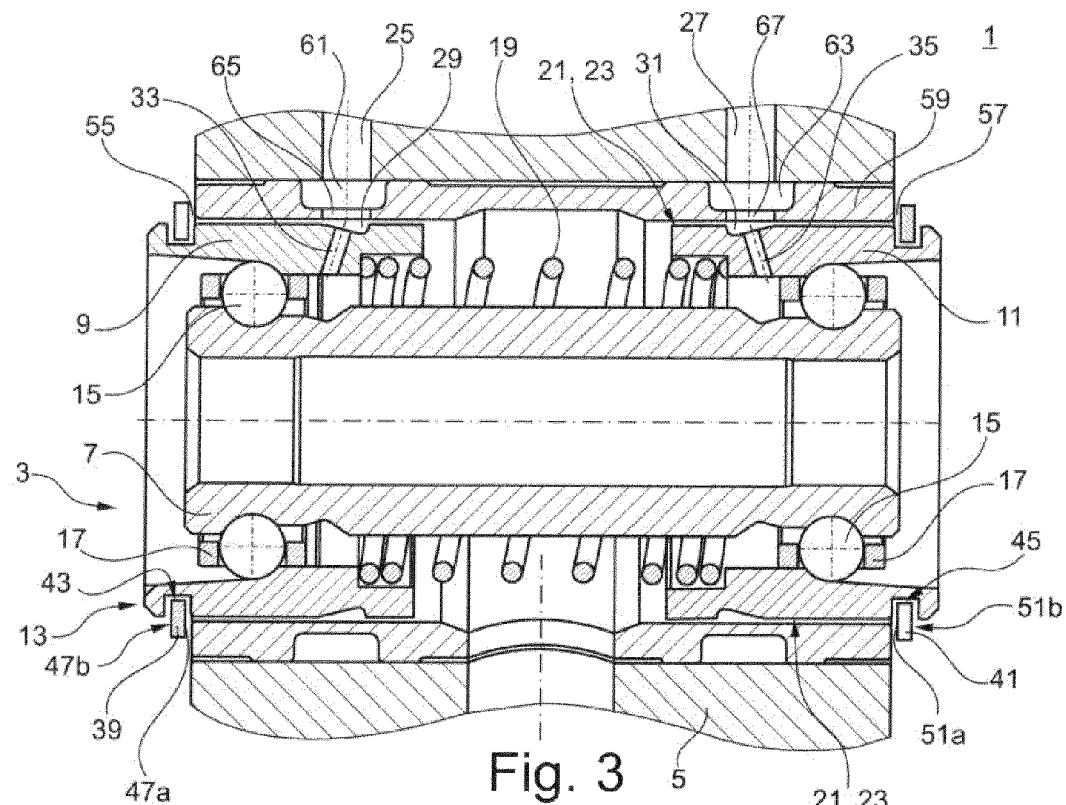
FIG. 3 an alternative embodiment of a bearing unit for a turbocharger in a longitudinal section, FIG. 4 another embodiment of a bearing unit for a turbocharger in a longitudinal section, and FIG. 5 another embodiment of a bearing unit for a turbocharger in a longitudinal section.

Parts that correspond to each other are provided with the same reference symbols in all of the figures.

FIG. 1 shows a bearing unit 1 for a turbocharger in a longitudinal section. The bearing unit 1 comprises a roller bearing 3 that is arranged coaxially in a through-hole of a bearing housing 5 extending in an axial direction. The roller bearing 3 is constructed as a two-row angular contact ball bearing and is formed of a one-part bearing inner ring 7, as well as a bearing outer ring 13 divided axially into a first sub-ring 9 and a second sub-ring 11. In addition, the roller bearing 3 has balls as roller bodies 15 between raceways of the bearing inner ring 7 and bearing outer ring 13. The roller bodies 15 are kept at a constant distance by a cage 17 and prevented from contacting each other. The bearing inner ring 7 is arranged, in the installed state, on a shaft that is not shown in the present case.

The two sub-rings 9, 11 of the bearing outer ring 13 are spaced apart from each other axially. The axial distance is here achieved by a pretensioning spring 19 formed as a metallic spiral spring. The pretensioning spring 19 is positioned between the two sub-rings 9, 11 and presses the two sub-rings 9, 11 apart from each other and holds them in a spring-mounted way and against the roller bodies 15 pretensioned at the provided spacing.

An intermediate space 21 with an oil film 23 is formed between the outer periphery of the bearing outer ring 13 and the bearing housing 5. The intermediate space 21 or the oil film 23 is provided with oil in the installed state via two supply holes 25, 27. Here, both supply holes 25, 27 are each connected in a fluid-communicating manner to grooves 29, 31 surrounding the bearing outer ring 7 on its outer periphery. Starting from the grooves 29, 31, the oil can be distributed both in the axial direction and also over the periphery of the roller bearing 3 such that a uniform oil film 23 can form in the intermediate space 21 between the roller bearing 3 and the inner wall of the bearing housing 5. The intermediate space 21 is formed wide enough in the present case that the oil film 23 allows a sufficient thickness for vibration damping between the bearing outer ring 7 and the bearing housing 5. In addition, the oil is pressed from the grooves 29, 31 in the bearing outer ring 13 via two spray oil holes 33, 35 into the bearing inner space and is available for lubricating and cooling the bearing components.

Furthermore, two securing rings 39, 41 are mounted that are formed as snap rings for axial path limitation on the bearing outer ring 13. A first securing ring 39 here engages in a first groove 43 on the radially outer lateral surface of the first sub-ring 9. A second securing ring 41 engages in a second groove 45 on the radially outer lateral surface of the second sub-ring 11. The arrangement of the first securing ring 39 in the first groove 43 is shown larger in detail view X. The arrangement of the second securing ring 41 in the second groove 45 is shown larger in detail view Y. In the first sub-ring 9, a gap with an oil film is formed between the two end faces 47a, 47b of the first securing ring 39 and the two groove flanks 49a, 49b of the first groove 43. A corresponding situation applies for the second sub-ring 11. Here, between the two end faces 51a, 51b of the second securing ring 41 and the two groove flanks 53a, 53b of the second groove 45 there is also a gap with an oil film. Each oil film is formed by the oil also flowing in the axial direction from the intermediate space 21. In addition, an axial gap with an oil film 55, 57 is formed between the end faces 47a, 51a of the two securing rings 39, 41 on the housing side in the axial direction and facing the axial bearing housing center and the bearing housing 5. These oil films 55, 57 are also formed, in particular, by the oil flowing in the axial direction from the intermediate space 21. The oil film 55, 57 and the oil film between the groove flanks 49a, 49b, 53a, 53b and the end faces 47a, 47b, 51a, 51b of the securing rings 39, 41 also damp vibrations in these areas and prevent direct contact of the components with each other as much as possible, which has a positive effect on low-noise operation. In addition, this construction contributes to the fact that a flattest possible, planar support is provided and thus, in particular, no tipping moment is transferred to the two sub-rings 9, 11. Furthermore, the bearing loads are significantly reduced, which leads to a longer service life of the bearing unit 1.

The two securing rings 39, 41 are supported by means of an end face 47a, 51a against the bearing housing 5. Here, the securing rings 39, 41 are used as axial end stops and path limitation. The securing rings 39, 41 prevent undesired slippage of the respective sub-ring 9, 11 and absorb axial forces and forward these via the oil film 55, 57 into the bearing housing 5. Therefore, in particular, the pretensioning spring force can be selected relatively low, because axial forces do not have to be supported via the pretensioning spring 19. If, for example, an axial force occurs on the shaft in the installed state, then depending on the axial force direction, one of the two securing rings 39, 41 is supported in the axial direction from the outside on the bearing housing 5. Here, the support of the bearing outer ring 13 or the two sub-rings 9, 11 is basically subject to a certain amount of play. The play is here especially dependent on the temperature. This play is defined in the required guidance accuracy especially so that also different changes in length between the bearing inner ring 7, the bearing outer ring 13, and the bearing housing 5 can be compensated and these do not lead to a tensioning of the roller bearing 3.

FIG. 2 shows the bearing unit 1 according to FIG. 1 in a cross section along the section line II-II shown in FIG. 1. Here, in particular, the first securing ring 39 inserted into the first groove 43 of the first sub-ring 9 can be seen clearly. For the further description of the individual bearing components of the bearing unit 1, at this point refer to the detailed description of FIG. 1.

FIG. 3 shows an alternative embodiment of a bearing unit 1 for a turbocharger in a longitudinal section. In contrast to FIGS. 1 and 2, between the bearing housing 5 and the bearing outer ring 13 there is a carrier ring 59. The carrier ring 59 is locked in rotation with the bearing housing 5. Within the carrier ring 59, the roller bearing 3 is arranged coaxially. Between the bearing outer ring 13 and carrier ring 59 there is the vibration-damping oil film 23 in which the bearing outer ring 13 is mounted. Here, the bearing outer ring 13 has a limited radial play and a certain amount of axial play. Supply holes 25, 27 in the bearing housing 5 are connected for oil supply to grooves 61, 63 formed in the carrier ring 59. The grooves 61, 63 each open into holes 65, 67 that are formed in the carrier ring 59 on the inner periphery of this carrier ring. The holes 65, 67 open, in turn, into the grooves 29, 31 surrounding the outer periphery of the bearing outer ring 13.

Two securing rings 39, 41 formed as snap rings are inserted according to FIGS. 1 and 2 in grooves 43, 45 of the two sub-rings 9, 11 and are used, in particular, for axial path limitation of the bearing outer ring 13. In contrast to FIGS. 1 and 2, the two securing rings 39, 41 are supported by a respective end face 47a, 51a indirectly via the carrier ring 59 axially from the outside against the bearing housing 5. Thus, the two securing rings 39, 41 are supported for axial forces acting on a supported shaft in the axial direction indirectly via the carrier ring 59 against the bearing housing 5 and axial forces are led via the securing rings 39, 41, the oil films 55, 57, and the carrier ring 59 into the bearing housing 5.

Figure 4:
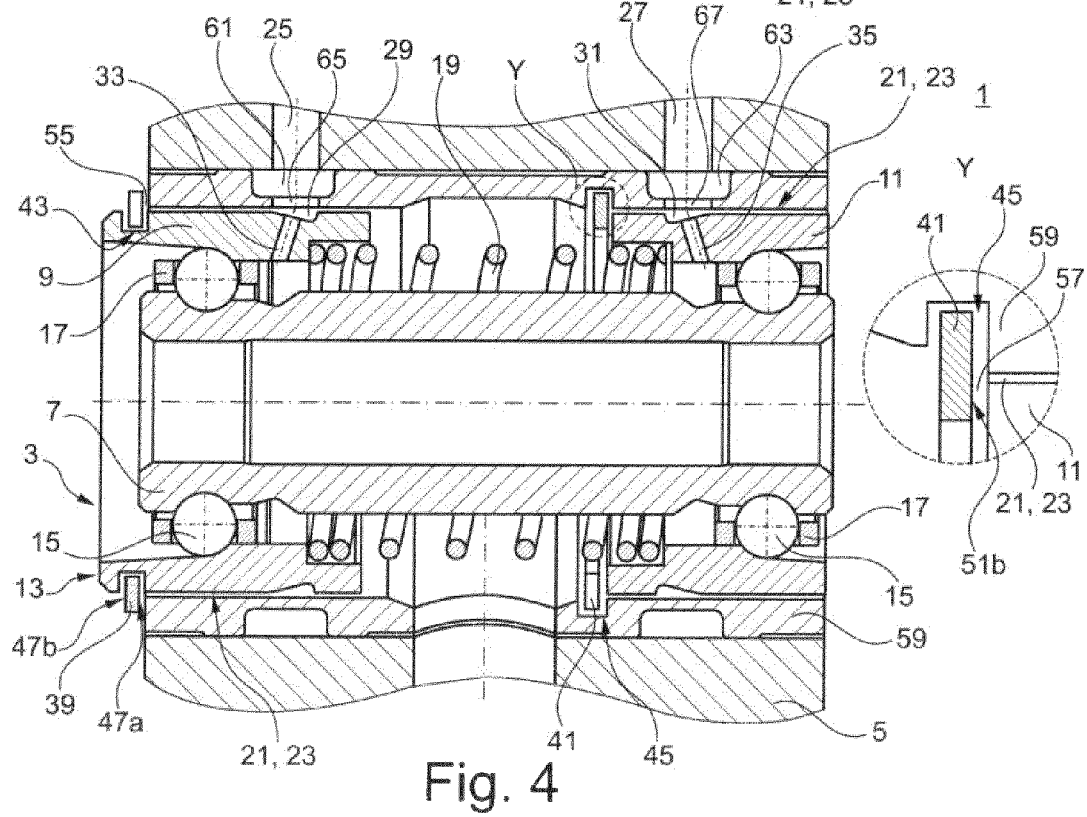

In FIG. 4, another embodiment of a bearing unit 1 for a turbocharger is shown in a longitudinal section. This bearing unit 1 corresponds essentially to the bearing unit 1 described in FIG. 3. In contrast to FIG. 3, here, the carrier ring 59 has axially within the bearing housing 5 in its radially inner lateral surface, a second groove 45 with a second securing ring 41 arranged therein, wherein the second sub-ring 11 is supported axially against the second securing ring 41. The end face 51b of the second securing ring 41 facing the second sub-ring 11 is used as an axial end stop for the second sub-ring 11. In this way, less installation space is required for the bearing unit 1. The first securing ring 39 of the first sub-ring 9 is supported according to FIG. 3 axially from the outside on an end face of the carrier ring 59 that is in direct contact with the bearing housing 5. The securing rings 39, 41 are here corresponding to FIGS. 1 and 2 inserted into the two grooves 43, 45 with an oil film between the groove flanks 49a, 49b, 53a, 53b and the end faces 47a, 47b, 51a, 51b of the securing rings 39, 41. In addition, an axial gap with an oil film 55 is formed between the end face 47a of the first securing ring 39 on the housing side in the axial direction and facing the axial bearing housing center and the carrier ring 59. In addition, an axial gap with an oil film 57 is formed between the axially inner end face of the second sub-ring 11 and the end face 51b of the second securing ring 41 facing the second sub-ring 11.

Figure 5:
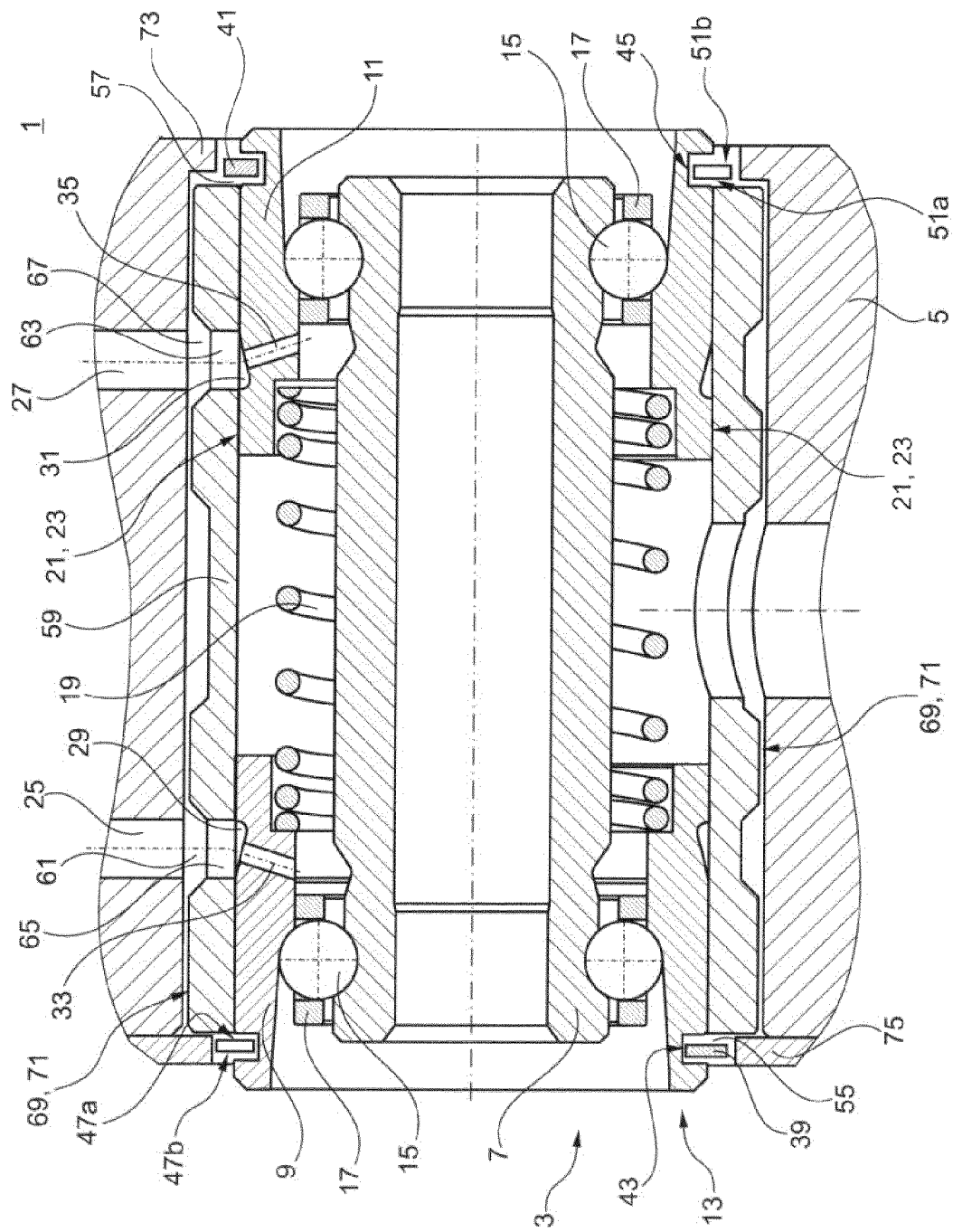

FIG. 5 shows another embodiment of a bearing unit 1 for a turbocharger in a longitudinal section. This bearing unit 1 corresponds essentially to the bearing unit 1 shown in FIG. 3. In contrast to FIG. 3, here between the bearing housing 5 and outer periphery of the carrier ring 59 there is an intermediate space 69 with a vibration-damping oil film 71. A tight interference fit is present between the bearing outer ring 13 and the inner periphery of the carrier ring 59. Here, in addition to the oil film 23 formed between the bearing outer ring 13 and inner periphery of the carrier ring 59 there is also a vibration-damping oil film 71 in the intermediate space 69 between the bearing housing 5 and the outer periphery of the carrier ring 59. Thus, both the bearing outer ring 13 and also the carrier ring 59 are mounted in an oil film 23, 71. Because the carrier ring 59 can move basically in the axial direction in this construction, the bearing housing 5 has on one end side a shoulder 73 and on the other end side a housing-fixed securing plate 75 on which the carrier ring 59 can be supported in the axial direction depending on the axial force direction.

The two securing rings 39, 41 are inserted according to FIG. 3 into grooves 43, 45 of the two sub-rings 9, 11 and are here according to FIGS. 1 and 2 equipped with an oil film between the groove flanks 49a, 49b, 53a, 53b and the end faces 47a, 47b, 51a, 51b of the securing rings 39, 41. In addition, an axial gap with an oil film 55, 57 is formed between the end faces 47a, 51a of the two securing rings 39, 41 on the housing side in the axial direction and facing the axial bearing housing center and the carrier ring 59. In addition, there is a vibration-damping oil film between the carrier ring 59 and securing plate 75 and between the carrier ring 59 and the shoulder 73 of the bearing housing 5. The first securing ring 39 is supported by means of its end face 47a indirectly via the oil film 55 and the carrier ring 59 that can be supported here on the shoulder 73 of the bearing housing 5 axially from the outside against the bearing housing 5. The second securing ring 41 is supported with its end face 51a axially indirectly via the oil film 57 and the carrier ring 59 on the securing plate 75 and thus on the bearing housing 5. Thus, the securing rings 39, 41 prevent an undesired slippage of the bearing outer ring 13 and absorb axial forces and guide these indirectly via the carrier ring 59 into the bearing housing 5. One special advantage of the embodiment shown in FIG. 5 is that here a vibration-damping oil film is present between the carrier ring 59 and bearing housing 5 and securing plate 75, wherein the bearing loads and the noise development can be further significantly reduced.

All of the mentioned embodiments can be equipped with a bearing inner ring 7 partially or completely integrated into the shaft of the bearing unit. The shaft is not shown as such in the figures, but its function can be integrated into the bearing inner ring 7 completely or partially. Here, the shaft can be connected axially on the end side to the not shown compressor or turbine with a material-locking, positive-locking, or non-positive-locking fit.

LIST OF REFERENCE NUMBERS

1 Bearing unit
3 Roller bearing
5 Bearing housing
7 Bearing inner ring
9 First sub-ring
11 Second sub-ring
13 Bearing outer ring
15 Roller body
17 Cage
19 Pretensioning spring
21 Intermediate space
23 Oil film
25, 27 Supply hole
29, 31 Groove
33, 35 Spray oil hole
39 First securing ring
41 Second securing ring
43 First groove
45 Second groove
47a, 47b End face
49a, 49b Groove flank
51a, 51b End face
53a, 53b Groove flank
55 Oil film
57 Oil film
59 Carrier ring
61, 63 Groove
65, 67 Hole
69 Intermediate space
71 Oil film
73 Shoulder
75 Safety plate

The invention claimed is:

1. A bearing unit for a turbocharger comprising a bearing housing extending in an axial direction with a through hole, a roller bearing arranged coaxially within the through-hole with a bearing inner ring, a bearing outer ring divided axially into first and second sub-rings, and a number of roller bodies, the bearing outer ring is mounted in a vibration-damping oil film, the two sub-rings are spaced apart from each other axially by a pretensioning spring, and the first sub-ring has a first groove with a first securing ring arranged therein, and the first securing ring is supported axially from outside against the bearing housing, wherein a gap with a vibration-damping oil film is formed between a groove flank and an end face of the securing ring.

2. The bearing unit according to claim 1, wherein the bearing inner ring is constructed as a shaft.

3. The bearing unit according to claim 1, wherein a carrier ring is arranged between the bearing housing and the bearing outer ring, and the first securing ring is supported by the carrier ring and the bearing housing.

4. The bearing unit according to claim 3, wherein an axial gap with a vibration-damping oil film is formed between the first securing ring and the bearing housing or an axial gap with a vibration-damping oil film is formed between the first securing ring and the carrier ring.

5. The bearing unit according to claim 3, wherein the carrier ring is locked in rotation with the bearing housing.

6. The bearing unit according to claim 3, wherein an intermediate space with a vibration-damping oil film is formed between the bearing housing and an outer periphery of the carrier ring.

7. The bearing unit according to claim 3, wherein the second sub-ring has a second groove with a second securing ring arranged therein and wherein the second securing ring is supported axially from outside against the bearing housing.

8. The bearing unit according to claim 1, wherein the roller bearing is constructed as a two-row angular contact ball bearing.

9. A bearing unit for a turbocharger comprising a bearing housing extending in an axial direction with a through hole, a roller bearing arranged coaxially within the through-hole with a bearing inner ring, a bearing outer ring divided axially into first and second sub-rings, and a number of roller bodies, the bearing outer ring is mounted in a vibration-damping oil film, the two sub-rings are spaced apart from each other axially by a pretensioning spring, and the first sub-ring has a first groove with a first securing ring arranged therein, and the first securing ring is supported axially from outside against the bearing housing, wherein a carrier ring is arranged between the bearing housing and the bearing outer ring, and the first securing ring is supported by the carrier ring and the bearing housing, wherein the carrier ring has a second groove with a second securing ring arranged therein and the second sub-ring is supported axially against the second securing ring.

10. The bearing unit according to claim 7, wherein the second securing ring is arranged on the second sub-ring and an axial gap with a vibration-damping oil film is formed between the second securing ring and the bearing housing or the second securing ring and the carrier ring or the second securing ring is arranged on the carrier ring and an axial gap with a vibration-damping oil film is formed between the second securing ring and the second sub-ring.

* * * * *